United States Patent [19]
Mangalam

[11] Patent Number: 5,218,863
[45] Date of Patent: Jun. 15, 1993

[54] INSTRUMENTATION SYSTEM FOR DETERMINING FLOW STAGNATION POINTS

[76] Inventor: Siva M. Mangalam, 17 Mile Course, Kingsmill on the James, Williamsburg, Va. 23185

[21] Appl. No.: 783,217
[22] Filed: Oct. 28, 1991
[51] Int. Cl.⁵ .................... G01C 21/00; G01M 9/00
[52] U.S. Cl. ........................... 73/147; 73/180; 73/204.11; 244/203
[58] Field of Search ............... 73/147, 180, 178 R, 73/178 T, 178 H; 244/204.11, 203, 204, 130

[56] References Cited

U.S. PATENT DOCUMENTS

| | | | |
|---|---|---|---|
| 2,871,698 | 2/1959 | Bagby | 73/147 |
| 4,188,823 | 2/1980 | Hood | 73/147 |
| 4,435,695 | 3/1984 | Maris | 73/147 |
| 4,483,200 | 11/1984 | Togawa et al. | 73/861.05 |
| 4,524,620 | 6/1985 | Wright et al. | 73/587 |
| 4,649,387 | 3/1987 | Maris | 73/147 |
| 4,651,564 | 3/1987 | Johnson et al. | 73/204 |
| 4,727,751 | 3/1988 | Holmes et al. | 73/147 |
| 4,848,153 | 7/1989 | Stack et al. | 73/432.1 |
| 4,898,036 | 2/1990 | Gray | 73/861.74 |
| 4,932,610 | 6/1990 | Maestrello | 244/203 |
| 5,127,264 | 7/1992 | Schmalz | 73/147 |
| 5,136,881 | 8/1992 | Kendall | 73/147 |

Primary Examiner—Donald O. Woodiel
Attorney, Agent, or Firm—Raymond L. Greene

[57] ABSTRACT

A method and portable microcomputer-based system for determining flow field stagnation points are disclosed. The apparatus uses hot film sensors wrapped around the leading edge of an airfoil to measure boundary layer oscillations. A plurality of sensor signals are provided which may be selected in groups. Signals from sensors in any group are read simultaneously. The signals are then converted to digital form and displayed on the video display of a microcomputer. Points of airflow stagnation are characterized by a doubling in frequency or other discrete harmonics and by a reversing of the phase of oscillations. Those points are identified by displaying and comparing signals from different sensor locations on a video display.

12 Claims, 12 Drawing Sheets

INSTRUMENTATION SYSTEM FOR DETERMINING FLOW STAGNATION POINTS

BACKGROUND OF THE INVENTION

1. Field of the Invention

The present invention relates to wind tunnel and aircraft instrumentation and more particularly to instrumentation for determining flow stagnation points.

2. Description of Prior Art

Design of aerodynamic surfaces, including airfoils turbine blades, propellers, fan blades and other lift-producing surfaces requires the accurate determination of flow field characteristics, either through experimental or analytic methods. Design of particular airfoil characteristics, such as camber, platform, thickness and others, will control laminar to turbulent flow transition points, along the airfoil and therefore control aerodynamic performance. Likewise, once a design is fixed, flight conditions, such as angle-of-attack, lift and drag, can be determined by locating stagnation points and other flow phenomena. Of these phenomena, flow stagnation points are of prime importance.

Despite the importance of locating the stagnation points, accurate location is difficult using conventional techniques. Design of leading edge shapes, where it is necessary to determine flow stagnation points, has typically required extensive wind tunnel testing. Conventional means of determining flow stagnation points, using various flow visualization techniques or using multiple total pressure sensors, also require multiple tunnel runs, particularly if it is desired to accumulate data across several speed ranges and angle-of-attack ranges. In the case of rotating surfaces, such as surfaces of propellers or turbine blades, accurate determination of flow stagnation is an even more difficult and lengthy process.

Experimental techniques typically include the use of a series of pressure ports around a leading edge. Because of the very large pressure gradients near the stagnation point, accuracy requires a large number of very small holes and associated pressure tubing in the stagnation region. Physical constraints of a wing generally preclude this type instrumentation except in limited experimental set-ups. Even in experimental set-ups, the design of airfoil sensors is laborious.

Likewise, analytic methods have also been cumbersome. Understanding of laminar-to-turbulent flow transitions has generally been restricted to steady state, two-dimensional flows. A variety of modeling techniques have been used to further describe transition-related phenomena such as "unit Reynolds Number effect", "Receptivity", "Bypass Mechanisms", and different types of breakdowns of boundary-layer instability. Nonetheless, the models for the physical mechanisms involved in the transition process have been inadequate. The major problem is that most models "freeze" the flow field, in either time or space, resulting in incomplete or erroneous results.

Freezing the flow field is not appropriate, even for leading edge flow, since experimental observations confirm unsteadiness at the very inception of the boundary layer. The influence of the leading-edge geometry and freestream parameters on the instability of laminar boundary layers has been the subject of many theoretical and experimental investigations. Goldstein (1985) found that the Stokes shear wave and the streamwise velocity gradient had a significant effect on the generation of Tollmien-Schlichting waves at the leading edge. Hall (1985) considered the instability mechanisms for the flow around a torsionally oscillating cylinder and concluded that when the basic state has a steady component of the same order as the oscillating part, then there is a strong possibility of interaction between the instability mechanisms associated with the steady and unsteady components. Lighthill (1954) in his pioneering work on the response of laminar boundary layers to fluctuations in the stream velocity obtained expressions for critical oscillatory frequencies for Hiemenz and Blasius flows. The influence of these frequencies on the leading-edge laminar boundary layer subject to acoustic excitation was investigated by Leehey & Shapiro (1979) who concluded that the T-S mode could be excited significantly.

In all the above studies, fluctuations in the laminar boundary layer were assumed to be caused by either oscillations in incoming flow or by oscillations of the body. The invention herein is based on a new analytic model which postulates that airflow around a body is inherently oscillatory even in laminar regions, including around the leading edge or near the stagnation point, because of transmitted effects of downstream flow.

SUMMARY OF THE INVENTION

Accordingly, it is an object of the present invention to provide a method and instrumentation system for determining flow stagnation points on airfoil surfaces.

It is a further object of the present invention to provide a method and instrumentation system for determining flow stagnation points on rotating aerodynamic surfaces including propellers and turbine blades.

It is yet another object of the present invention to provide a method and instrumentation system for determining flow stagnation points by simultaneously determining phase, coherency and frequency of the low-frequency oscillations in an airfoil boundary layer.

These objects are achieved by the method of this invention which includes (1) providing an instrumented airfoil located in a flow field; (2) sensing simultaneous output signals from a plurality of sensors; (3) computing the frequency of flow oscillations for the simultaneous data; (4) comparing the output and determining phase and coherency; and (5) determining stagnation points by identifying the phase reversal point and the presence of higher order harmonic frequencies.

The apparatus of the invention is a microcomputer-based portable system for detecting flow field conditions including stagnation points. It comprises multi-element hot film sensors suitable for attachment to a wing surface, and a plurality of thermal anemometer cards together with signal conditioning, multiplexing, and support circuitry, all of which is functionally connected to a microcomputer. The microcomputer contains a custom data acquisition card capable of collecting multiple simultaneous channels of data.

BRIEF DESCRIPTION OF THE DRAWINGS

The above and numerous other objects of the invention that may be achieved by the method and preferred embodiment of the invention will be more readily understood from the following detailed description and the appended drawings wherein.

DETAILED DESCRIPTION OF THE INVENTION

Figure 1:
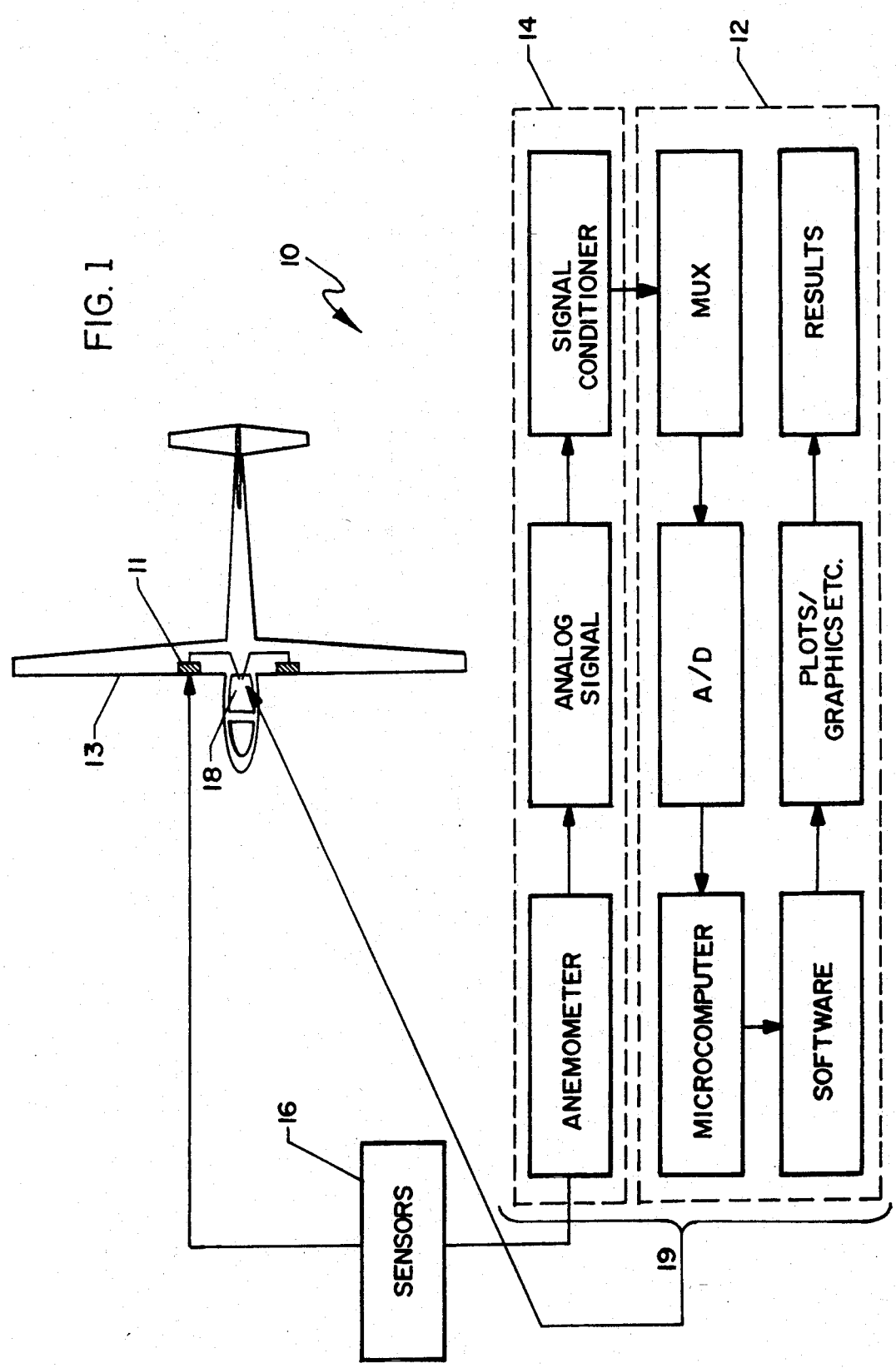
FIG. 1 is a block diagram of the overall apparatus for detecting stagnation points.

Referring now to FIG. 1, the apparatus for determining flow field stagnation, designated generally by the numeral 10 is shown with the major components depicted by a block diagram. The digital data acquisition, processing, and instrumentation system consists of a personal computer (PC)-based portable package 19 augmented with thermal anemometer cards, signal conditioning, multiplexing, and support circuitry. The rack-mounted enclosure housing 14 having augmented components is external to the computer. The data acquisition and processing system 12 contains a custom data acquisition card with analog-to-digital converters, and specialized software in addition to a microcomputer system. Specially developed data acquisition software allows the computer to collect, store, and analyze the data. The complete package with the exception of the sensors is carried in cockpit instrument bay 18. The program provides time histories and spectral information based on Fast Fourier Transforms (FFT) including coherence and phase relationship between various signals. The mean and root mean square (RMS) levels of different signals are also computed. The signal conditioner card provides both gain and anti-alias filtering functions. These functions allow elimination of spurious frequencies and provide amplification of desired signals. The software supports the simultaneous acquisition of signals from a set of any eight sensors and sequential collection of data from up to eight sets without user intervention. Once the anemometers are set up at operating conditions, the data acquisition is completely under computer control. Sensors 16 are hot film sensors, conventially known in the art, which are attached to an airfoil 13 forming a test location 11 around the leading edge on both the upper and lower surfaces of the airfoil.

Figure 2:
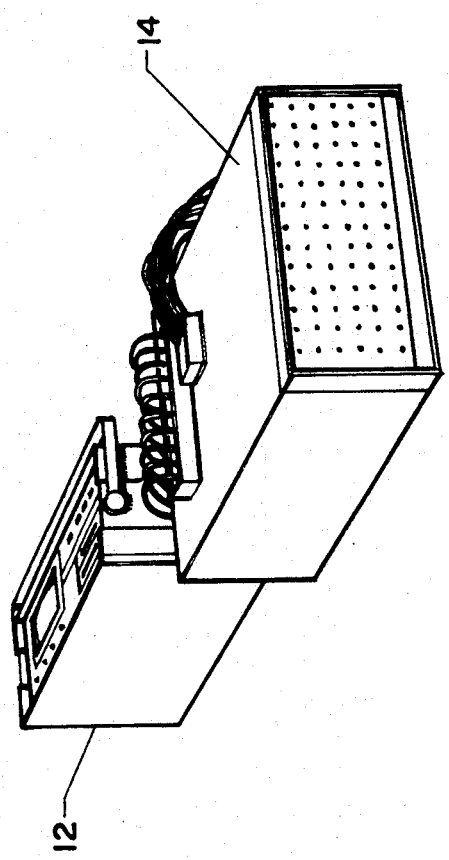
FIG. 2 is a perspective view of the flight test system.

FIG. 2 depicts the flight system with data acquisition and processing system 12 and the rack-mounted enclosure housing 14. The enclosure contains a signal conditioner, multiplexer, and up to sixteen anemometer cards. Multiple rack-mounted housings may be connected together so as to support the use of multiple sets of discrete sensors on the airfoil (or any other body) surface. The multiplexer card permits the selection of sensors. This selection is controlled by the computer through the eight-bit digital output port located on the analog-to-digital converter (ADC) circuit card. The system can simultaneously acquire signals from any eight sensors by appropriately configuring the multiplexer.

Figure 3:
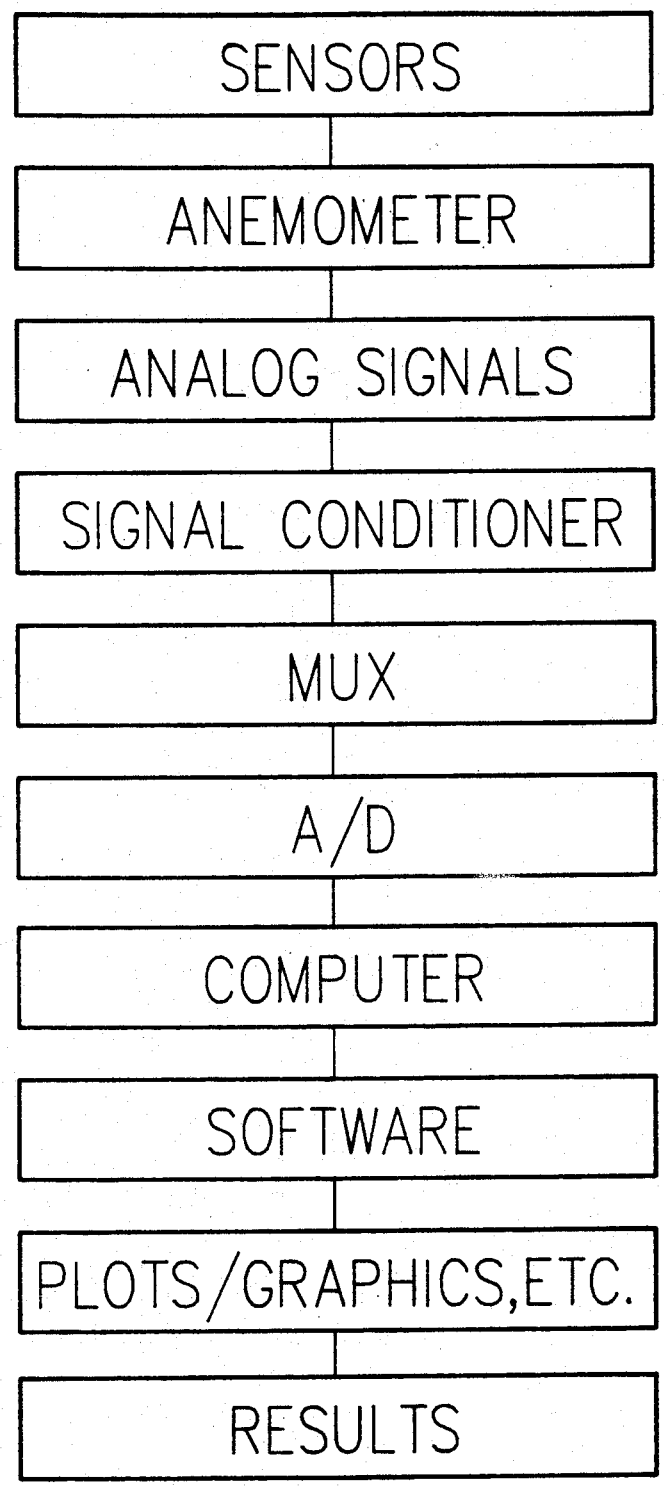
FIG. 3 is a block diagram of the major functional components of the invention.

Referring now to FIG. 3, a block diagram depicts the functional relationship of the major elements in the instrumentation system. Operation of the instrumentation system is based on maintaining each sensor at a predetermined temperature. The anemometer card provides power to maintain the sensor temperature as is known in the art. The signal output from the anemometer card is an analog signal which is proportional to the changes in flow conditions. These signals are filtered through a signal conditioning card. A preselected set of signals is then sent to the analog-to-digital card using the multiplexer (MUX). After digitizing through the analog-to-digital conversion card (A/O), the signal is stored on the microcomputer software which controls system operation and sensor selection and also allows graphic display and plotting of any chosen set of signals. For displaying results, the software amplifies and filters the signals, thereby facilitating the visual identification of various phase and frequency characteristics results.

Figure 4:
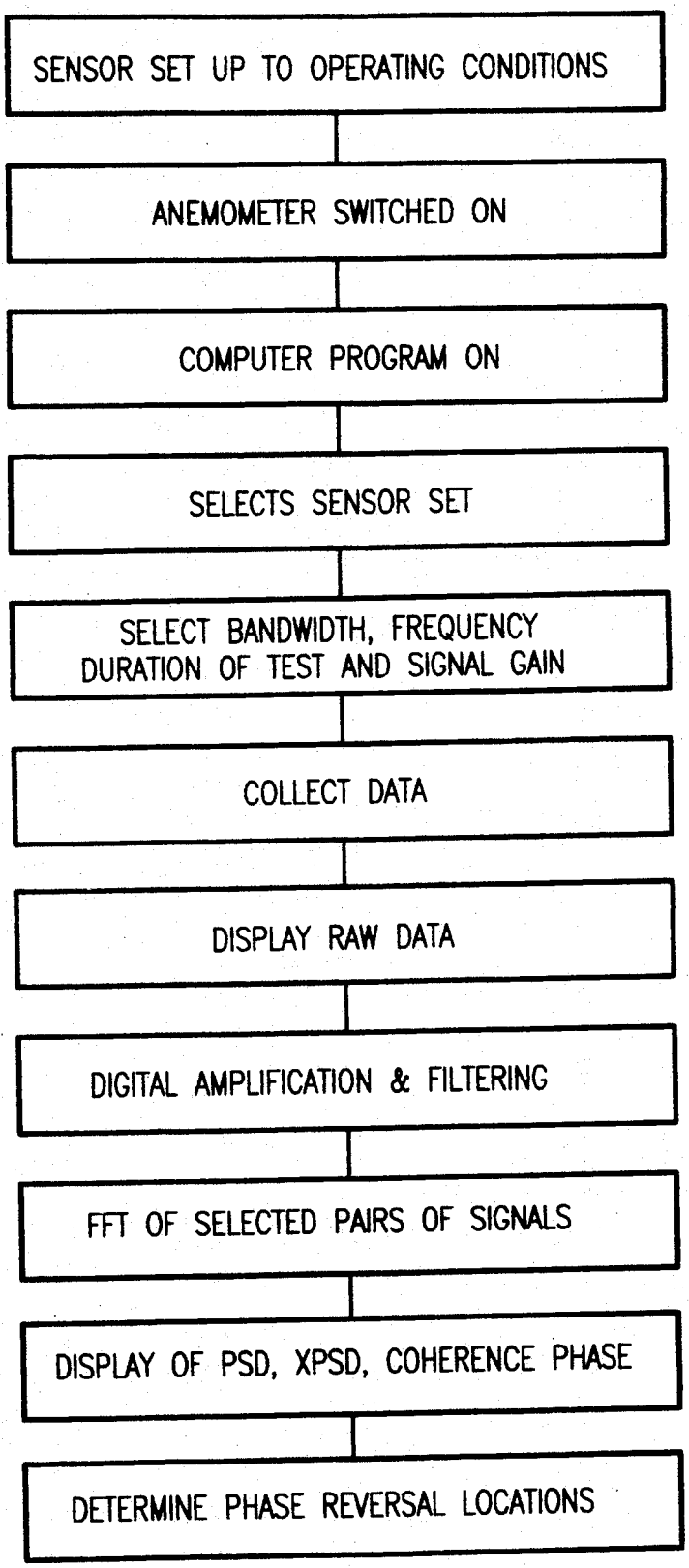
FIG. 4 is a flow chart of the software processing steps of the invention.

Referring to FIG. 4, a flow chart of the operation is shown. The steps and method are as follows: Initial setup of the sensors is accomplished by manual operator adjustment of sensor resistance and input voltages. Likewise, anemometer and computer power-on is accomplished by manual operation. Thereafter, all steps are software-controlled. The software package developed has three main functions: a) the selection of sensor configuration and test sampling requirements; b) data acquisition; and c) data processing and display of results.

The sensor configuration, that is, the number and sequence, are selected through the software control of the multiplexer card. Thereafter, bandwidth, number of data points per test, and test conditions, such as altitude and velocity, are specified. A test run is accomplished and data is collected and stored. At this point, the last data collected are displayed on the computer screen as raw data for visual inspection. These raw signals are further amplified and filtered to facilitate visual identification of phase relationships, such as phase reversal and harmonics. Raw signals are then further processed by Fast Fourier Transform to provide frequency characteristics. These characteristics are displayed as power spectral density, coherency, and phase relationships. The final step is operator visual identification of phase reversals and frequencies.

Figure 5A:
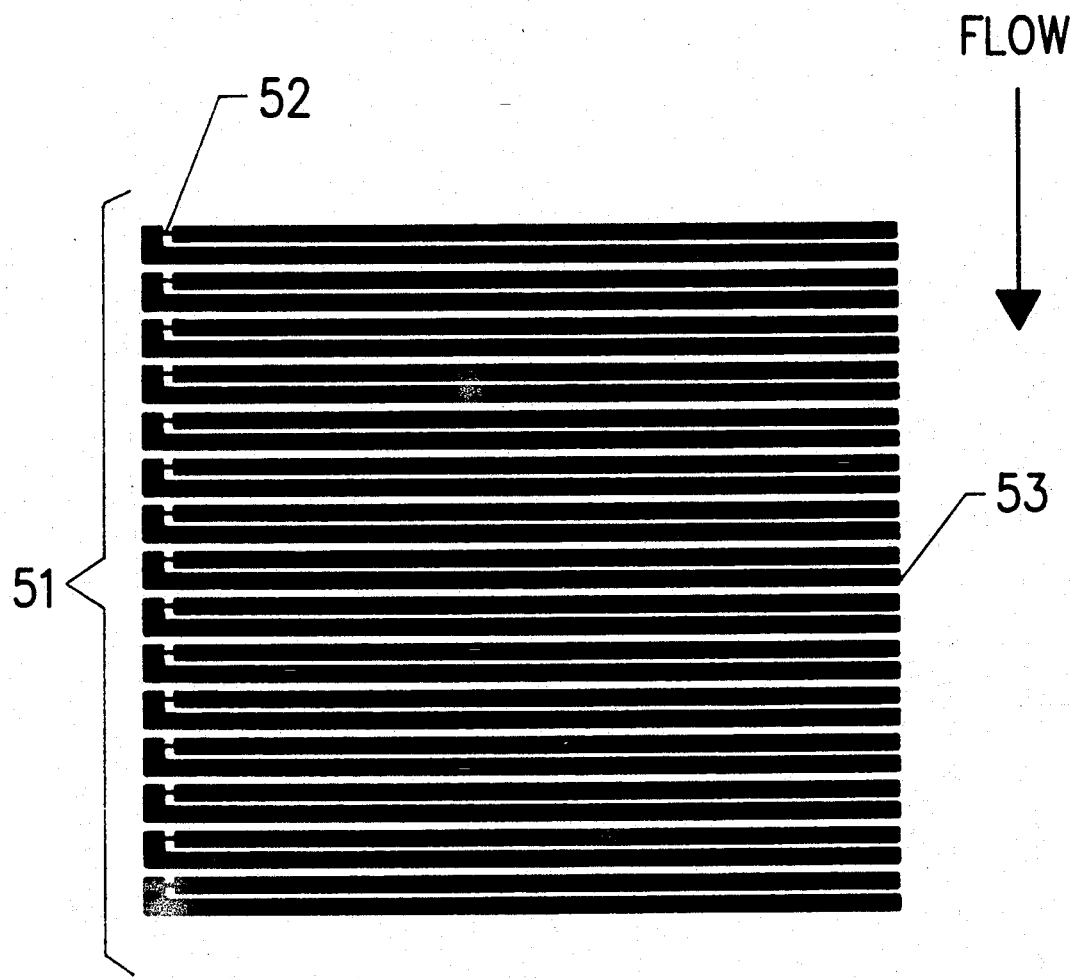
FIG. 5a is a configuration of multi-element sensors.
Figure 5B:
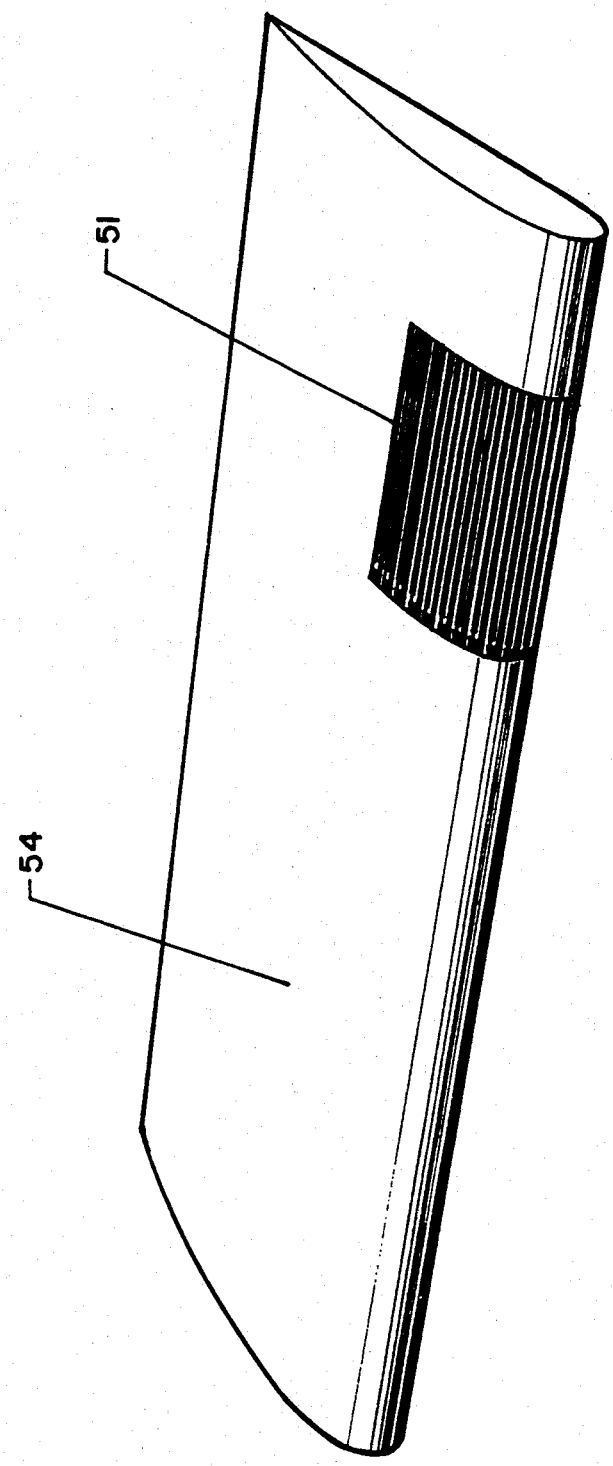
FIG. 5b is a perspective view on the leading edge of a wing.

FIG. 5a shows the configuration of commercially available multi-element sensors used with the system. The multi-element sensor 51 consists of a number of independent nickel films having an electron-beam evaporated element 52 on a thin polyamide substrate in a straight-line array. Each sensor element consists of a nickel film 0.9 mm long and 0.15 mm wide with 2-microns thick copper-coated nickel leads 53, routed to obtain a non-intrusive sensor system which does not disturb the local airflow. The unheated resistance of each sensor element is a nominal 5 ohms. There are sixty individual hotfilm sensor spaced at 2.5 mm intervals. As depicted in FIG. 5b (exaggerated in size), multi-element sensors 51 are wrapped around the leading edge of an airfoil 54 covering the forward area above and below the leading edge. The area covered permits the determination of stagnation points for a complete range of angels-of-attack.

Each element of these multi-element sensors is connected to an independent thermal anemometer card. Each anemometer card is provided with convenient test points to measure sensor and bridge resistances and the offset voltage. Switches are provided to set up appropriate offset voltage and overheat ratio for each sensor. The overheat ratio of the multielement surface hot-films is kept between 1.1 and 1.2.

Figure 6A:
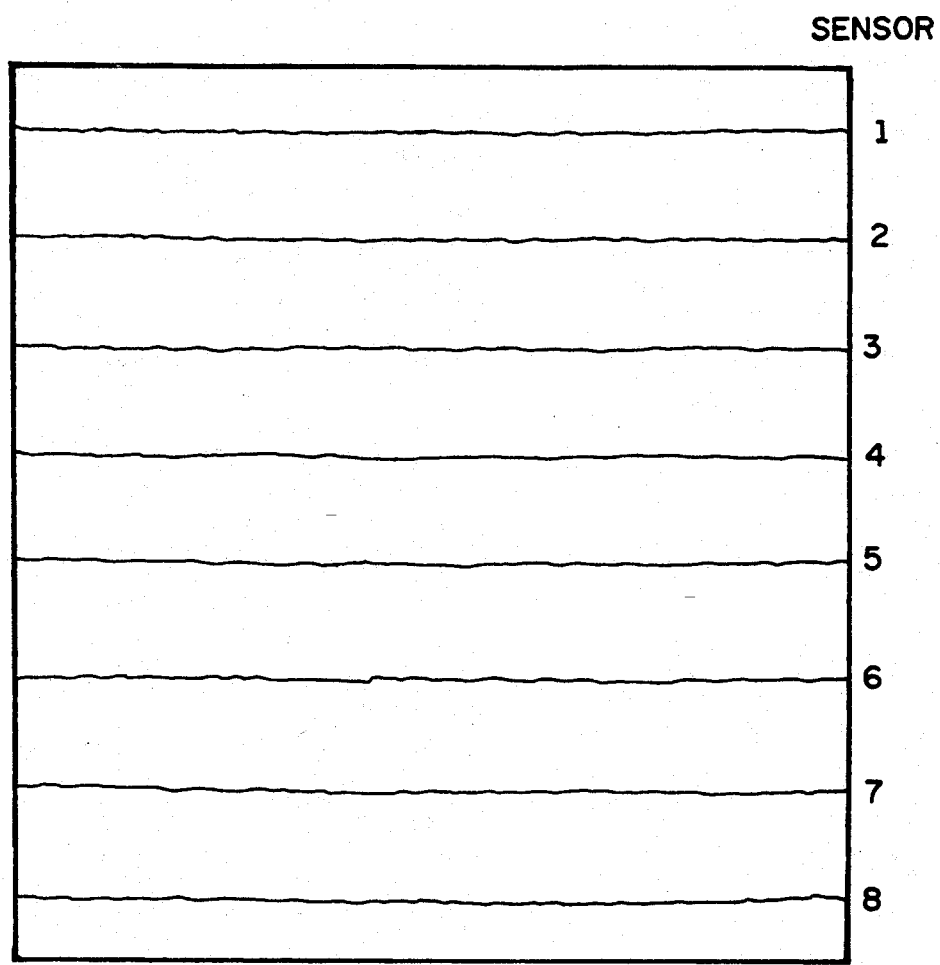
FIG. 6a is a chart showing raw sensor output signals at points along the airfoil.
Figure 6B:
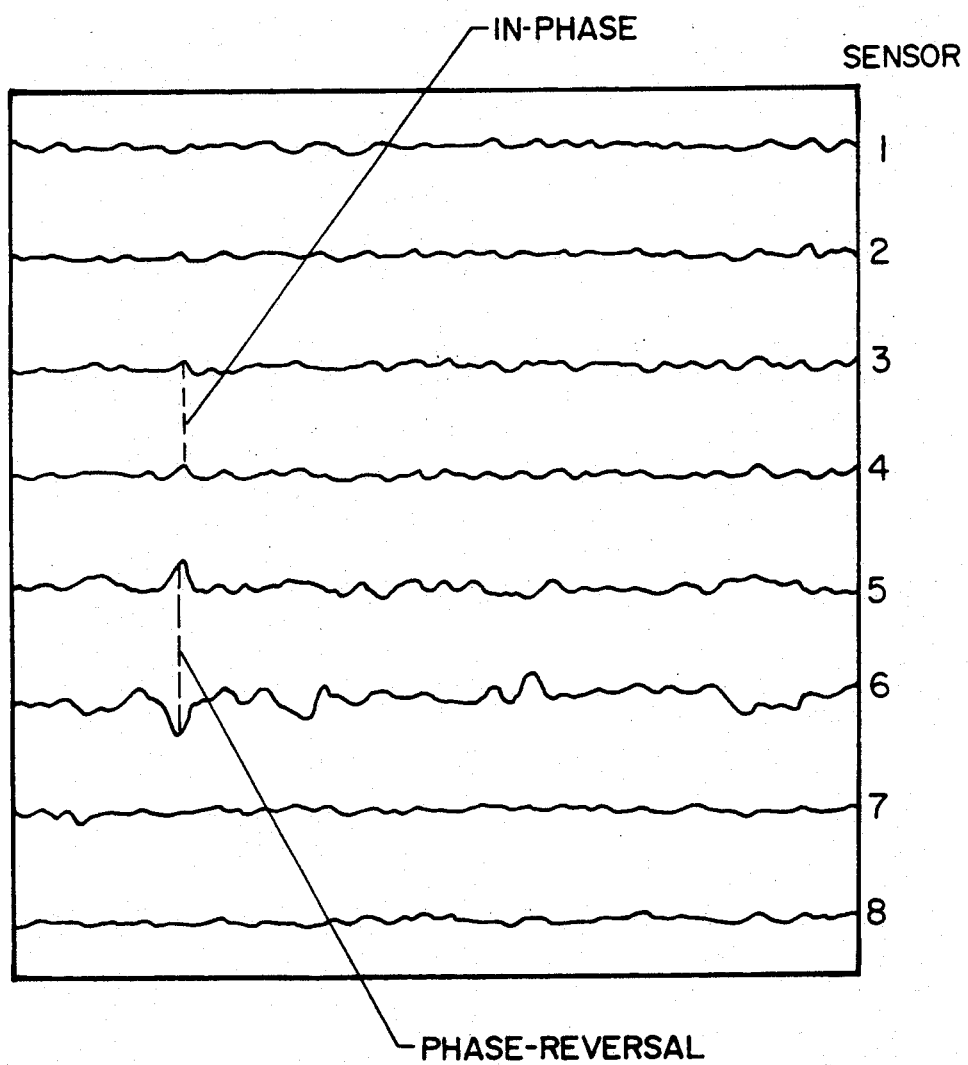
FIG. 6b is a chart showing sensor output signals after digital amplification and filtering.

Referring now to FIG. 6a, a typical set of raw signals from an airfoil stagnation region is shown. Since the signal amplitudes are within the electronics noise level, little useful information can be directly observed. Although sensors 1 through 8 show small perturbations, the magnitude of variations is very small as seen in this steady state flow. In order to obtain useful information, it is necessary to select a precise simultaneous time reading of all sensors. FIG. 6b, however, shows the same signals after digital amplification and filtering. The phase reversal shown between sensors 5 and 6 are clearly visible where signal amplitudes are opposed. For comparison, and in-phase signal is labeled between sensors 3 or 4.

Figure 7A:
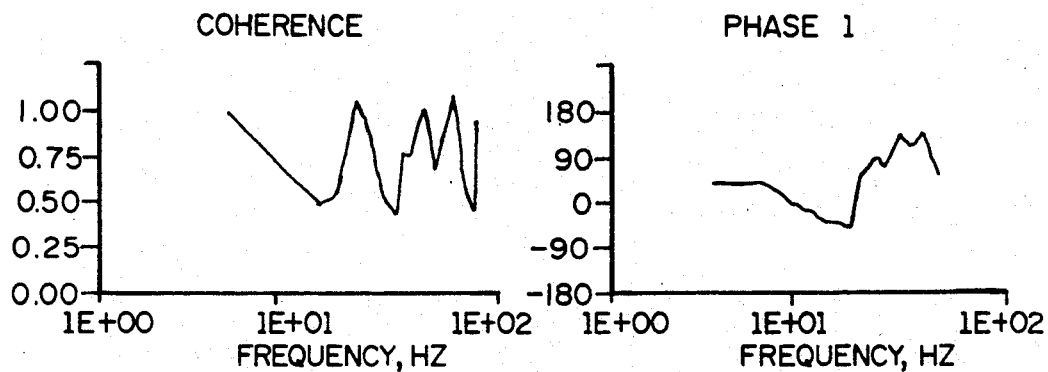
FIG. 7a is a chart showing phase angle and coherence for sensors 4 and 5.

FIGS. 7a, b and c show coherency and phase angle plots for different pairs of sensors signals. Coherency of the signal is plotted at precise frequencies ranging from 0 to 200 Hz (1E+00 to 1E+02). The ordinate values (0.00 to 1.00) show the percentage of coherence. Higher coherence indicates a greater consistency of data.

FIG. 7a shows the processed data from sensors 4 and 5 from FIG. 6b. The area of best data occurs for frequencies below 1E+01 as shown by the 75% coherency. The phase data on the right hand part diagram shows a phase angle of zero. The zero phase angle indicates the oscillatory flow in the 0 to 100 Hz range is in-phase and that no stagnation point lies between sensors 4 and 5.

Figure 7B:
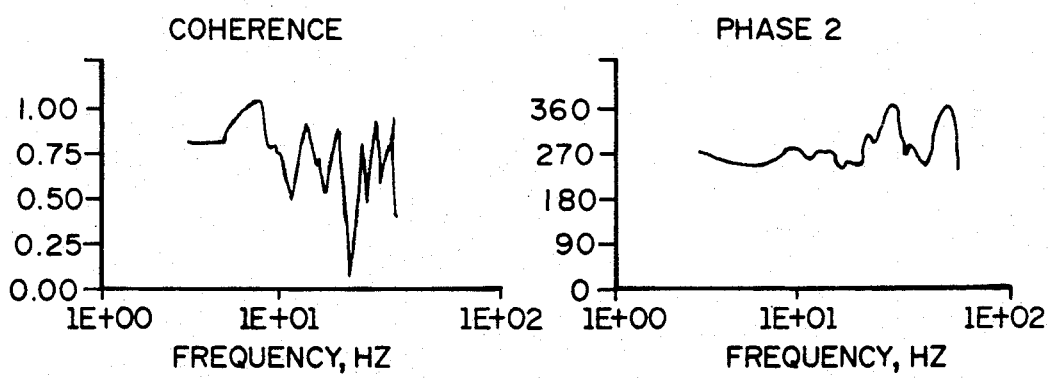
FIG. 7b is a chart showing phase angle and coherence for sensors 5 and 6.
Figure 7C:
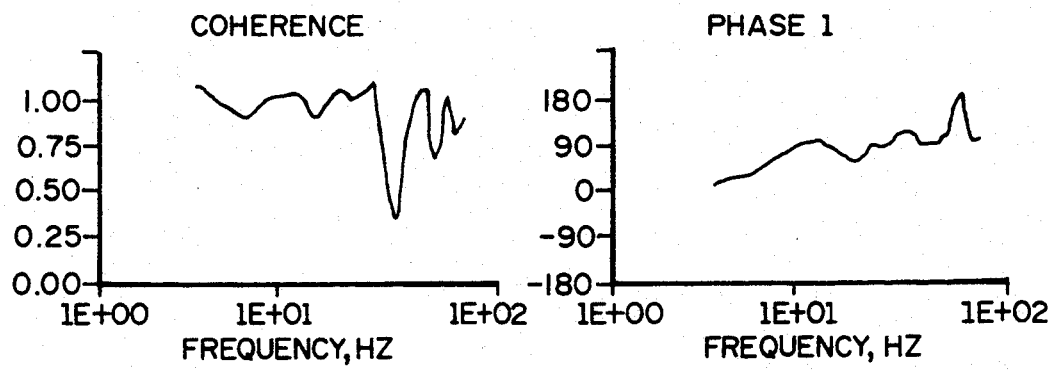
FIG. 7c is a chart showing phase angle and coherence for sensors 6 and 7.

FIG. 7b shows a phase angle of 180° between signals 5 and 6 indicating that the sensors are located on opposite sides of a stagnation point. Likewise in FIG. 7c, sensors 6 and 7 are both located on the other side of a stagnation point. The reversal of phase indicates that a stagnation point lies between the two sensors 5 and 6 as shown in the time-amplitude plot in FIG. 6b.

Figure 8:
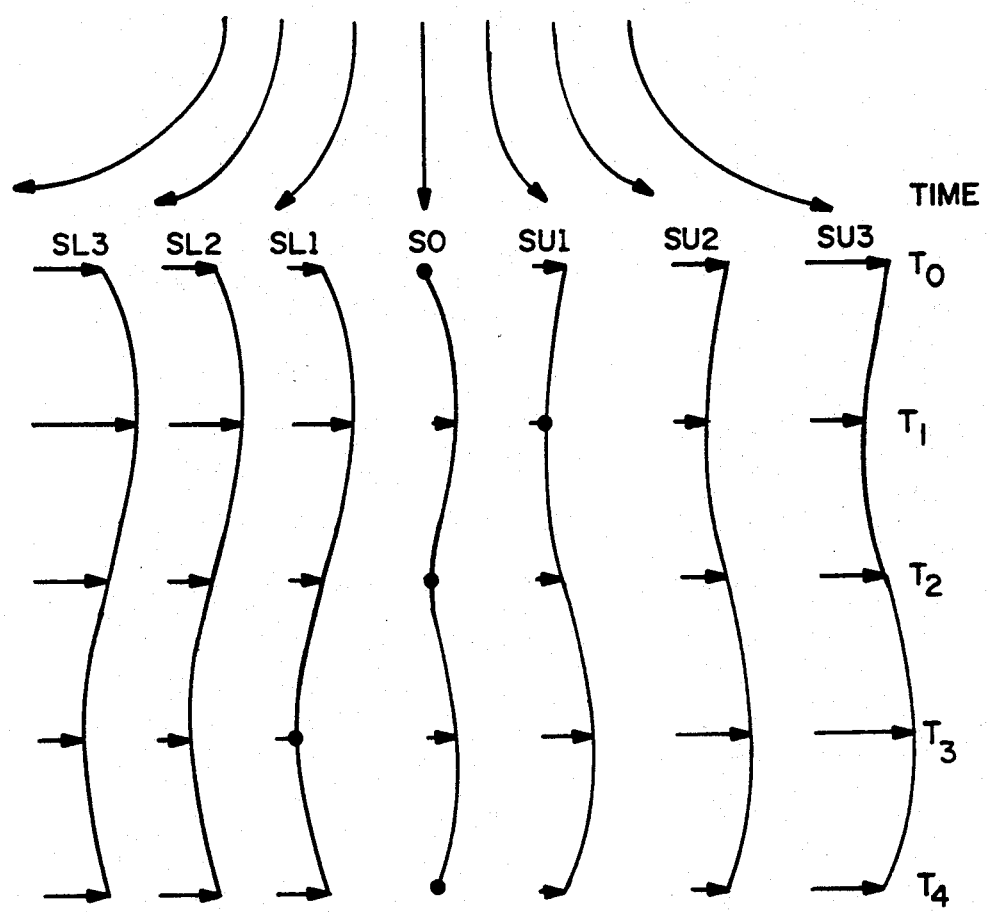
FIG. 8 is a schematic view showing flow magnitude at various sensor locations.
Figure 9:
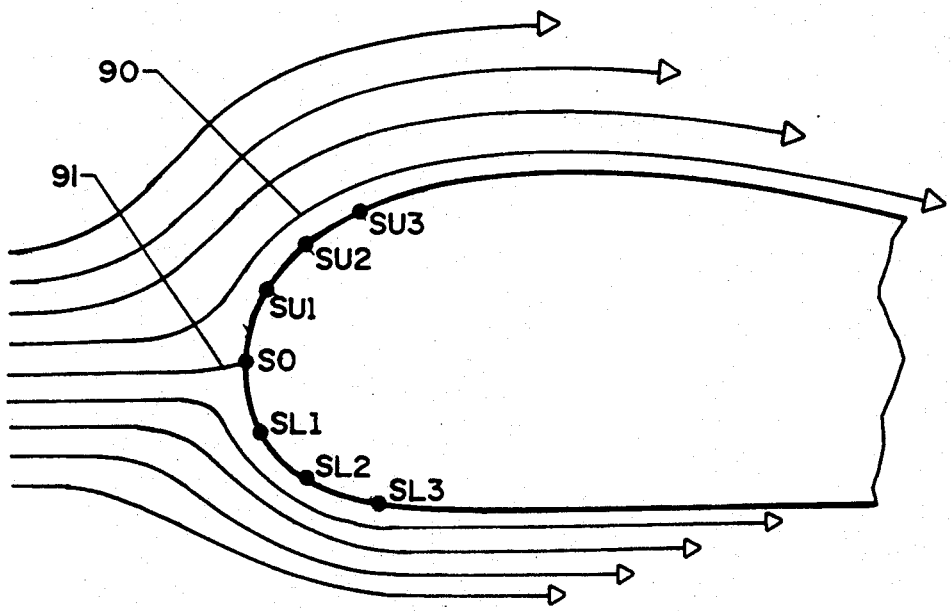
FIG. 9 is an airfoil section with streamlines and sensor locations.

The physical mechanism that causes this phase reversal can be further understood by reference to FIGS. 8, 9, 10 and 10a. Referring first to FIG. 9, a section of an airfoil leading edge is shown with sensors denoted $S_0$, the means stagnation point; $S_{L1}$, the first lower surface sensor; $S_{L2}$, the second lower surface sensor, and so on. Streamline 91 is the mean stagnation streamline which impacts the airfoil at the mean stagnation point $S_0$. Because of the oscillatory nature of the flow, streamline 91 moves downward impacting at $S_{u1}$, then $S_0$ and then $S_{L1}$, and then upward to $S_0$ and $S_{u1}$. This sequence is continuous during the flow conventially referred to as steady-state flow. All other streamlines likewise oscillate, and streamline 90, for illustration moves to create surface flow at $S_0$ when streamline 91 impacts $S_{L1}$. Referring now to FIG. 8 the sensor locations in the stagnation region are again identified as $S_{L3}$, $S_{L2}$, $S_{L1}$, $S_0$, $S_{U1}$, $S_{U2}$, $S_{U3}$. As noted, the stagnation region has been greatly expanded. In general, the flow is unsteady in the stagnation region and the mean stagnation streamline 91 (shown in this figure as the straight center arrow) moves back and forth across the sensors from $S_0$ to $S_{U1}$ to $S_0$ to $S_{L1}$ to $S_0$. At time $t_0$, the mean stagnation point is located at $S_0$ as depicted by the dot on the velocity wave. Horizontal arrows located within the diagram indicate the magnitudes of the voltages required to maintain the sensor temperature at various times. At time $t_0$, the minimum voltage occurs at the stagnation point at sensor locator $S_0$, and increases in magnitude as we move away from the stagnation point.

At time $t_1$, the mean stagnation streamline 91 has moved to sensor $S_{U1}$, and the minimum voltage occurs at the location. Similarly, the mean stagnation streamline 91 has moved back to sensor $S_0$ at time $t_2$ and further to $S_{L1}$ at time $t_3$, and back to $S_0$ at $t_4$, completing a cycle. The corresponding magnitudes of the voltages at other sensors and times are likewise indicated by the respective arrow length. (Please note: horizontal arrows do not represent flow direction only magnitude of voltage.)

By connecting the arrow heads (or plotting magnitude of required voltage) against time for each sensor location, a time trace is generated as shown. It can be observed that all the plots in Set U and L are in phase within the set, but the two sets are out of phase with each other. In addition, at sensor $S_0$, the mean stagnation location, the frequency has doubled to the first harmonic and the mean amplitude is reduced.

Figure 10:
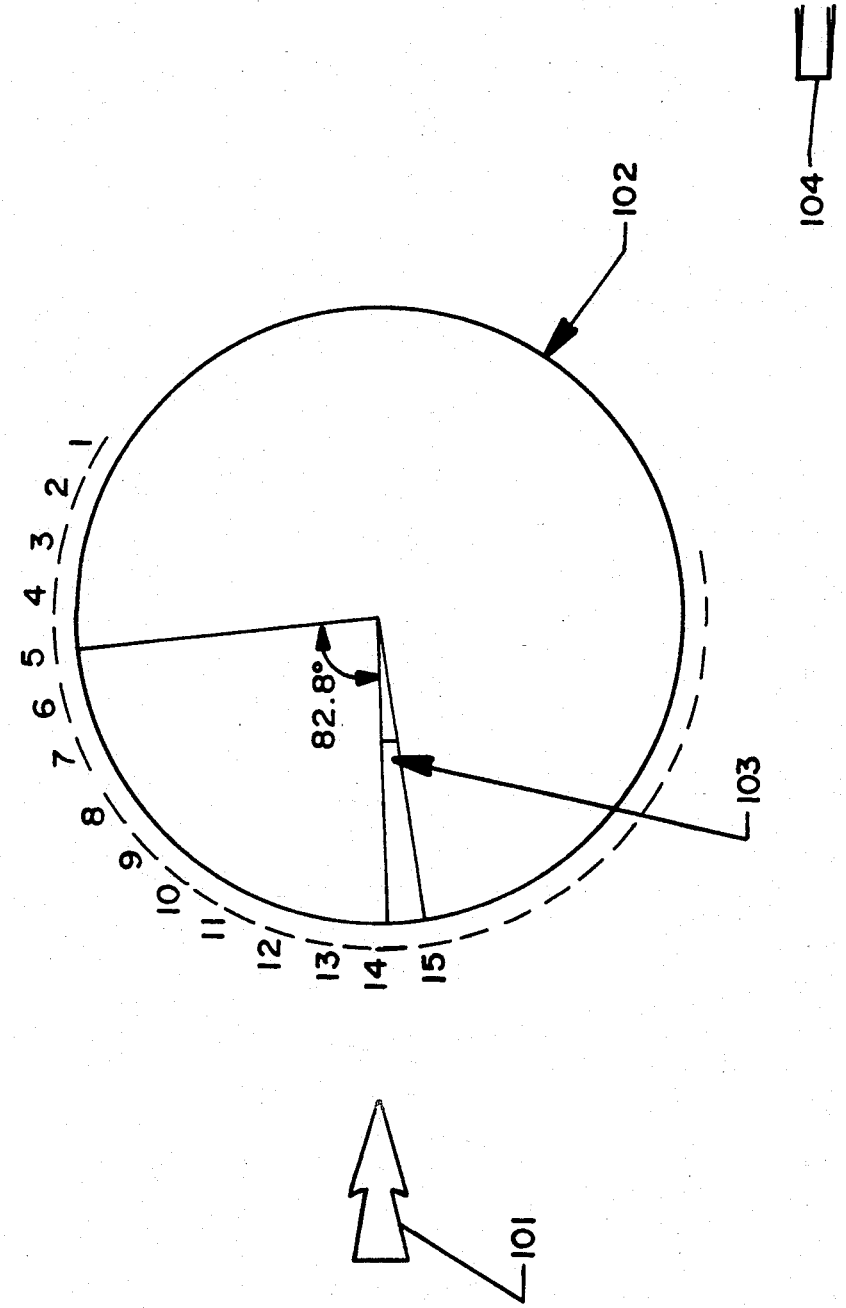
FIG. 10 is an end view of a cylinder with multi-element sensors along the leading edge and upper surface.
Figure 10A:
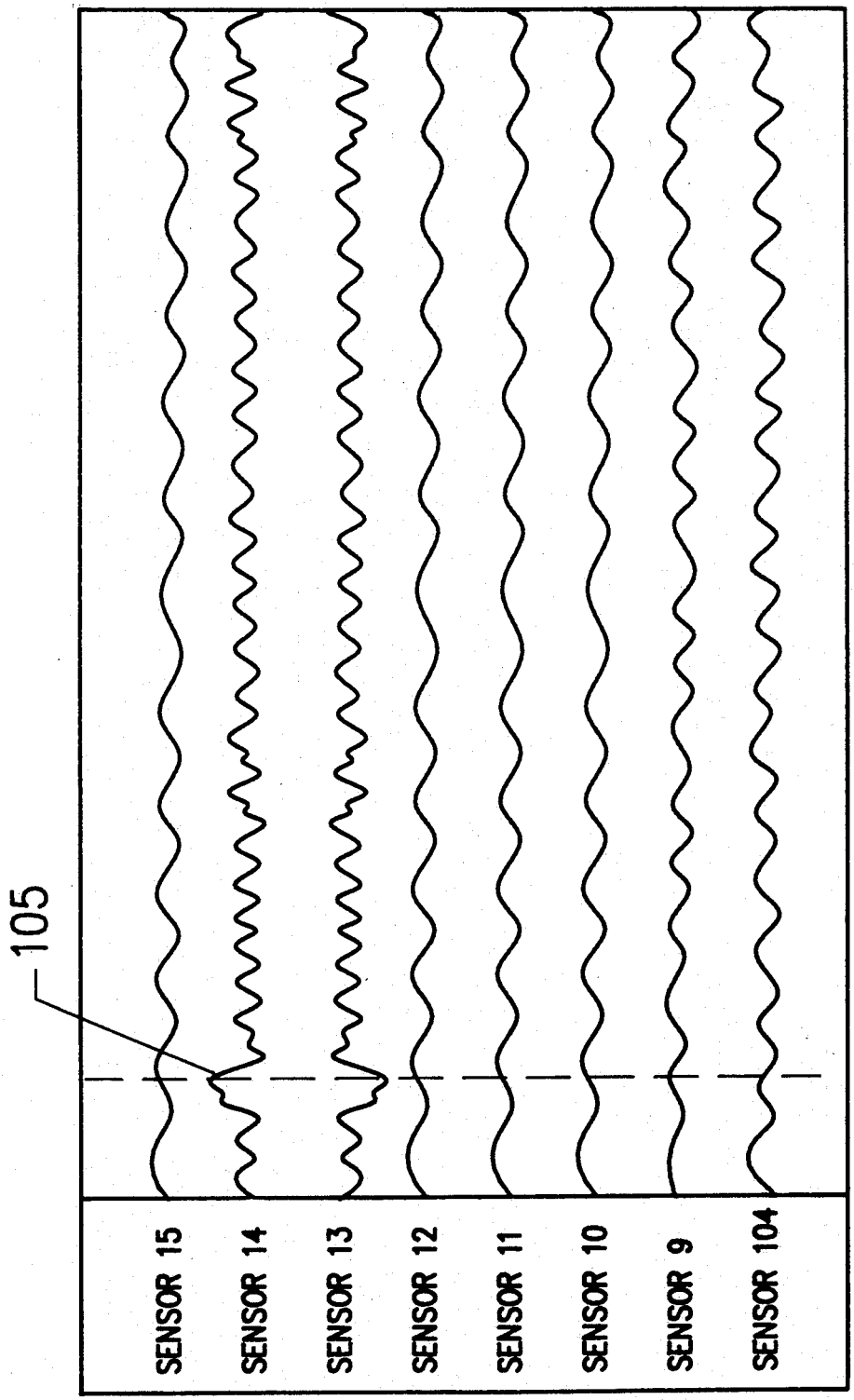
FIG. 10a is a plot of signals using the cylinder of FIG. 10.

This model reflects conditions which have been experimentally observed across a stagnation point. FIG. 10 shows a cylinder 102 instrumented with multi-element sensors numbered in sequence. Flow from left to right is as depicted by arrow 101. The stagnation region is between sensors 13 and 15. Sensor 104 is a downstream sensor which produces data from trailing edge flow. Angle 103 is shown for reference having an angle of 9.2 degrees in the test embodiment. Plot shown in FIG. 10a shows raw signals having a phase reversal 105 between outputs at sensor 14 and sensor 13. The fundamental frequency was determined to match the vortex shedding frequency in the cylinder wake as obtained from hot wire and shown on the plot of sensor 104.

The operation of the invention is based on the observation that even during steady state flow minute unsteadiness is inherent in the boundary layer flow caused by airfoil geometry. Even at the leading edge, oscillatory flow is evident, caused by many factors including vortex shedding at the trailing edge. The advantages of the invention include the novel sensing of stagnation conditions by use of low frequency phase oscillations and by the use of phase harmonics. Precise stagnation point location also allows calculation of instantaneous and steady state angle-of-attack.

Although the invention has been described relative to a specific embodiment thereof, there are numerous variations and modifications that will be readily apparent to those skilled in the art in the light of the above teachings. For example, a variety of computer hardware devices may be used in place of a microcomputer. Dedicated hardware such as transputers can be used and can replace part or all of the software. Various manual operations can also be automated. It is therefore to be understood that, within the scope of the appended claims, the invention may be practiced other than as specifically described.

What is claimed as new and desired to be secured by Letters Patent of the United States is:

1. A method for determining flow stagnation points on an airfoil comprising the steps of:
   (a) providing an airfoil located in a flow field;
   (b) locating a plurality of sensors on the surface of said airflow, said sensor location extending from the under surface around the leading edge to the upper surface;
   (c) sensing, from said plurality of sensors, simultaneous frequency oscillations in boundary layer flow;
   (d) generating output signals corresponding to the sensed frequency oscillations; and
   (e) comparing output signals to determine locations having both phase reversal and a higher frequency harmonics, such locations being flow stagnation points.

2. An apparatus for determining stagnation points on an airfoil comprising:
   (a) a plurality of multi-element hot film sensors located on an airfoil surface at the leading edge and wrapping around the leading edge thereby covering both upper and lower forward airfoil surfaces in the region of flow stagnation;
   (b) a plurality of sensor circuit cards electrically connected to said multi-element hot film sensors;
   (c) a multiplexer circuit card electrically connected to said sensor circuit cards;
   (d) an amplifier and signal conditioner circuit card electrically connected to said multiplexer circuit card;
   (e) an interface circuit card electrically connected to said amplifier and signal conditioner card;
   (f) a microcomputer containing said interface circuit card in an internal expansion slot; and
   (g) software for selecting sensors and displaying sensor signals generated by frequency fluctuations in heat transfer.

3. An apparatus for determining stagnation points on an airfoil comprising:
   (a) means for sensing boundary layer oscillations and providing signals thereof;
   (b) means for selecting and filtering said sensor signals;
   (c) means for processing sensor signals to obtain frequency characteristics; and
   (d) means for displaying frequency characteristics including phase and frequency of oscillation.

4. An apparatus for determining stagnation points as in claim 3 wherein said means for sensing boundary layer oscillations comprise a plurality of multi-element hot film sensors.

5. Multi-element hot film sensors as in claim 4 wherein each sensor comprises a plurality nickel sensor elements affixed to a non-conductive substrate.

6. An apparatus for determining stagnation points as in claim 3 wherein said means for sensing boundary layer oscillations further comprise a plurality of thermal anemometer means.

7. An apparatus for determining stagnation points as in claim 3 wherein said means for selecting and filtering said sensor signals comprises a software-controlled multiplexer circuit card.

8. An apparatus for determining stagnation points as in claim 3 wherein said means for processing said sensor signals further comprises an amplifier and signal conditioner circuit card.

9. An apparatus for determining stagnation points as in claim 3 wherein said means for processing sensor signals comprises a microcomputer having an internally-mounted interface circuit card for receiving selected sensor signals.

10. An interface circuit card as in claim 9 wherein said interface circuit card comprises an analog-to-digital converter having eight independent channels thereby allowing simultaneous reception of eight separate signals.

11. An apparatus for determining stagnation points as in claim 3 wherein said means for displaying frequency characteristics further comprises a software program.

12. An apparatus for determining stagnation points as in claim 3 wherein means for displaying frequency characteristics further comprise a video display of phase reversal signatures thereby identifying stagnation locations.

* * * * *